(12) United States Patent
Maalioune et al.

(10) Patent No.: US 9,482,183 B2
(45) Date of Patent: Nov. 1, 2016

(54) THRUST REVERSER CONTROL SYSTEM

(71) Applicant: AIRCELLE, Gonfreville l'Orcher (FR)

(72) Inventors: Hakim Maalioune, Orgeval (FR);
Alain Nourrisson, Orgeval (FR)

(73) Assignee: AIRCELLE, Gonfreville l'Orcher ( * ) Notice: Subject to any disclaimer, the term of this patent is extended or adjusted under 35 U.S.C. 154(b) by 0 days.

(21) Appl. No.: 14/527,112

(22) Filed: Oct. 29, 2014

(65) Prior Publication Data
US 2015/0097499 A1    Apr. 9, 2015

Related U.S. Application Data

(63) Continuation of application No. PCT/FR2013/050969, filed on May 2, 2013.

(30) Foreign Application Priority Data

May 4, 2012 (FR) ...................... 12 54099

(51) Int. Cl.
| | |
|---|---|
| H02P 29/04 | (2006.01) |
| F02K 1/76 | (2006.01) |
| B64D 33/04 | (2006.01) |
| H02P 3/22 | (2006.01) |

(52) U.S. Cl.
CPC ............... *F02K 1/763* (2013.01); *B64D 33/04* (2013.01); *H02P 3/22* (2013.01); *F05D 2260/903* (2013.01); *F05D 2270/021* (2013.01); *F05D 2270/52* (2013.01); *F05D 2270/62* (2013.01); *Y02T 50/671* (2013.01)

(58) Field of Classification Search
CPC ............ B60K 1/00; F02K 1/763; H02P 3/22
See application file for complete search history.

(56) References Cited

U.S. PATENT DOCUMENTS

| | | | |
|---|---|---|---|
| 5,125,468 A * | 6/1992 | Coker | ............... A61G 5/047 180/13 |
| 2003/0159429 A1 | 8/2003 | Langston et al. | |

FOREIGN PATENT DOCUMENTS

| | | |
|---|---|---|
| FR | 2 872 223 A1 | 12/2005 |
| WO | 2012/052552 A1 | 4/2012 |

OTHER PUBLICATIONS

International Search Report issued Aug. 16, 2013 in International Application No. PCT/FR2013/050969.

* cited by examiner

*Primary Examiner* — Karen Masih
(74) *Attorney, Agent, or Firm* — Burris Law, PLLC

(57) ABSTRACT

A control system for a thrust reverser with a movable cowl includes an electromechanical actuator to actuate the movable cowl, an electric drive unit (M) driving the actuator, and a power control unit capable of controlling the electric drive unit (M). The power control unit moves the movable cowl to a closed position and/or to a deployed position. In particular, the control system includes an electronic circuit for electric braking capable of braking the electric drive unit (M), in case of overspeed of the drive unit when the movable cowl is moved to the closed position and/or to the deployed position.

13 Claims, 1 Drawing Sheet

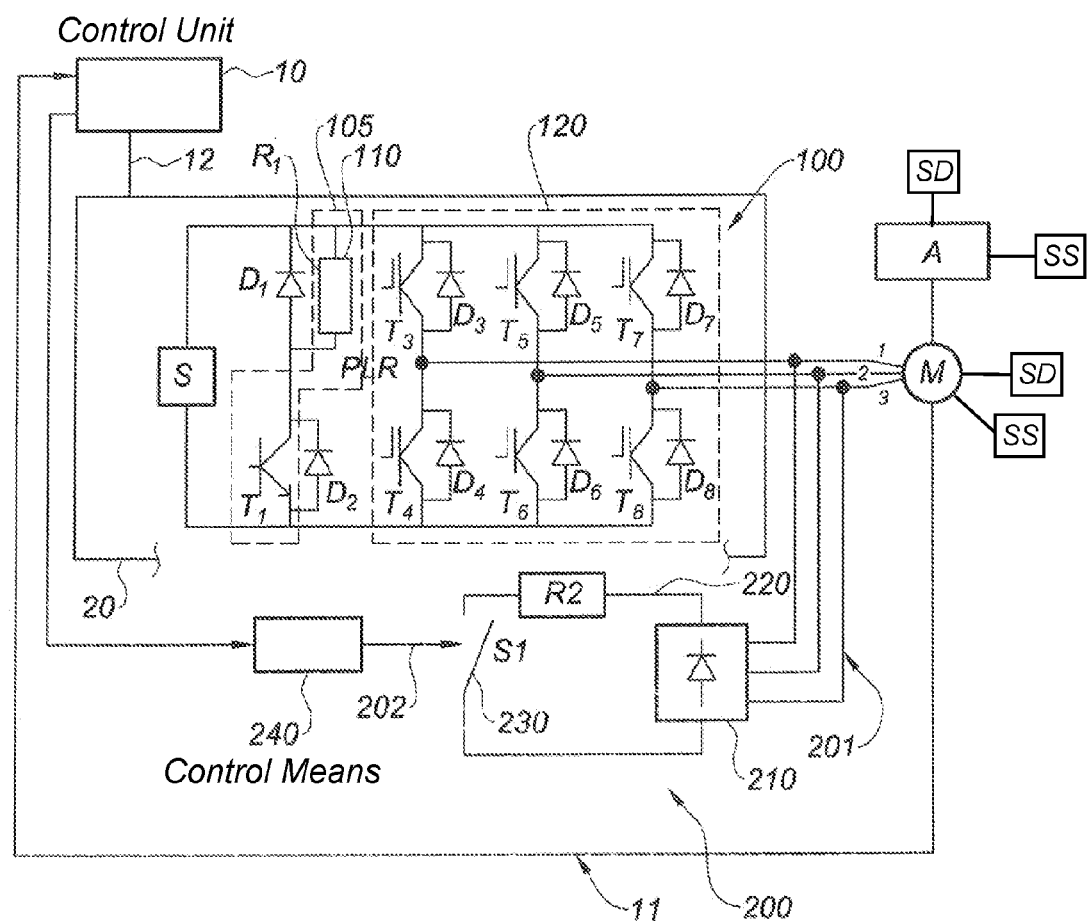

THRUST REVERSER CONTROL SYSTEM

CROSS-REFERENCE TO RELATED APPLICATIONS

This application is a continuation of International Application No. PCT/FR2013/050969, filed on May 2, 2013, which claims the benefit of FR 12/54099, filed on May 4, 2012. The disclosures of the above applications are incorporated herein by reference.

FIELD

The present disclosure relates to a control system for thrust reverser with moveable elements of a nacelle of an aircraft and also to a nacelle comprising such a system.

BACKGROUND

The statements in this section merely provide background information related to the present disclosure and may not constitute prior art.

An airplane is moved by several turbojet engines each housed in a nacelle also accommodating a set of additional actuating devices linked to its operation and providing diverse functions when the turbojet engine is in operation or at a stop.

These additional actuating devices comprise, in particular, a mechanical thrust reversal system.

More particularly, a nacelle usually exhibits a tubular structure comprising an air inlet upstream of the turbojet engine, a median section intended to surround a fan of the turbojet engine, a downstream section accommodating the thrust reversal means and intended to surround the combustion chamber of the turbojet engine and, usually terminated by an ejection nozzle located downstream of the turbojet engine.

This nacelle is intended to accommodate a dual flow turbojet engine able to generate by means of the blades of the fan in rotation a hot air flow, from the combustion chamber of the turbojet engine, and a cold air flow circulating outside the turbojet engine through an annular stream.

The thrust reversal device is, during landing of the aircraft, intended to improve the braking capacity of the latter by redirecting towards the front at least part of the thrust generated by the turbojet engine.

In this phase, the thrust reversal device obstructs the stream of cold air flow and redirects the latter towards the front of the nacelle, thereby generating a counter-thrust which adds to the braking of the wheels of the aircraft, the means implemented for achieving this reorientation of the cold air flow vary according to the type of reverser.

Different types of thrust reversal devices are usually known.

Another form of the latter provides that it comprises at least one element moveable between a closing position and an opening position cooperating in opening position to the production of the thrust reversal and at least one set of electromechanical maneuvering members for maneuvering the moveable element between the closing and opening positions.

The movable element may be, in non-limiting examples, a cowl of a nacelle, doors and/or reversal flaps upstream or downstream of the cowl of the nacelle.

As for the set of electromechanical maneuvering members, it comprises, substantially electric actuators intended to actuate the moveable elements and at least an electric bolt, called primary bolt intended to provide that they are maintained in retracted position and prevent any accidental deployment.

More particularly, the thrust reversal device is provided with three locking defense lines.

The set of electromechanical maneuvering members for maneuvering the moveable elements between their closing and opening positions of the thrust reverser are actuated by at least one electric turning machine according to the design of the system.

Moreover, the locks are reinforced by mechanical braking means controlled electrically, hydraulically or other.

Such braking means provide the blocking of the electric turning machine, in the event of loss of control of the latter or of the corresponding electromechanical member.

These mechanical braking means are, in particular, suited to protect from any overspeed of the electric turning machine and, thus, to have an additional security in the event of failure of this machine.

The mechanical braking means used may be, for example, a failsafe static brake using a technology of multiple disk brake type, a return spring brake and/or electrical unlocking control by an integrated linear actuator.

However, by mechanically blocking the motor at full speed, there is a risk of mechanically damaging the associated actuator.

In addition, such mechanical brakes are subject to rapid wear of the corresponding disks.

Furthermore, such mechanical brakes are heavy, bulky, complicated to implement and often expensive.

SUMMARY

The present disclosure provides a thrust reversal system that is globally more effective and less subject to the wear of its mechanical components, and the reversal system increases the effectiveness of the means for controlling the electromechanical maneuvering members of the nacelle while reducing the mass and bulkiness of these control means.

The present disclosure avoids any abrupt arrival of an electromechanical maneuvering member on corresponding ultimate stops.

More specifically, the present disclosure provides an electric control system for thrust reverser with moveable elements, the control system comprising at least one electromechanical actuating member of said moveable element, an electric driving unit of said actuating member, a control unit and a power control unit suited to control the electric driving unit for moving the moveable element to a closing position and/or to a deployed position in direct jet and in reverse jet characterized in that the control system comprises an electric braking electronic circuit suited for braking the electric driving unit, in the case of overspeed of the latter during the displacement of the moveable element to the closing position and/or to the deployed position.

Thanks to the present disclosure, one does without any mechanical braking means of the electromechanical actuating members and, more particularly, without any braking means having a mechanical engaging position with a constitutive element of the motor and/or a driving shaft of the associated motor in such a manner as to block it.

According to particular forms of the present disclosure, a control system according to the present disclosure may comprise one or several of the following features, taken alone or in a technically possible combination:

the control unit is suited to pilot the electric braking electronic circuit when the speed of the electric driving unit is higher than a threshold speed, in generator or electric driving unit motor mode;

the value of the threshold speed Vmax is a function of the position of the electromechanical actuating member driven by the electric driving unit in its displacement to its closing position and/or to its deployed position in direct jet and in reverse jet;

the electric braking electronic circuit is suited for suspending any control of the electric driving unit and for regulating the speed of the electric driving unit in such a manner as to attain a predetermined minimum speed set point;

the control system further comprises, one or several end of travel stops for the electromechanical actuating member fashioned for stopping the electromechanical actuating member after the electric driving unit has attained the minimum speed set point;

the electric braking electronic circuit is controlled as long as the minimum speed set point has not been attained by the electric driving unit;

the electric braking electronic circuit comprises at least one electric energy dissipation device mounted, in series, with a two-state switch, one of the two states being suited for connecting the electric driving unit to the energy dissipation device by means of a rectifier of which the input voltage is formed from the output signal of a power circuit of the electric driving unit;

the electric energy dissipation device is a power resistor;

the rectifier is a diode bridge circuitry and with natural commutation.

The present disclosure also relates to a nacelle comprising at least one electric device and an aforementioned control system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 represents a block diagram of an electric control system of a thrust reversal device of an aircraft according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Typically, a thrust reversal device comprises at least one element moveable between a closing position (stow phase) and an opening position (deploy phase) cooperating in opening position to the production of thrust reversal.

In a non-limiting form of a thrust reversal device with cascades, the moveable elements are a mobile cowl moveable between, on the one hand, a deployed position in which it opens in the nacelle a passage intended for the diverted air flow and, on the other hand, a retractable position in which it closes this passage.

The reorientation of the air flow is carried out by cascades, associated with second moveable elements, namely reversal flaps upstream of the cowl, the cowl only having a simple sliding function to uncover or recover these cascades.

As for the reversal flaps, they form obstructing doors able to be activated by the sliding of the cowl causing a closing of the cold flow stream downstream of the cascades, in such a manner as to improve the reorientation of the cold air flow.

It is worth noting that the thrust reversal device is in no way limited to that described and may be any known thrust reversal device, in particular a thrust reversal device with doors or reversal flaps downstream of the cowl of the nacelle.

The system for controlling the moveable elements is currently composed of at least one set of electromechanical maneuvering members for maneuvering the moveable elements between their closing and opening positions of the thrust reversal device.

These electromechanical maneuvering members substantially comprise electric actuators intended to activate the moveable elements. These actuators are schematized on FIG. 1 by the letter A.

They are associated with at least one electric bolt, called primary bolt, retaining each moveable element, to state detectors and sensors of the maneuvering members and the moveable elements of the thrust reversal device.

The sensors may comprise position and/or proximity sensors.

The thrust reversal device may comprise, in a known manner, also, secondary and tertiary electrical bolts.

Furthermore, these electric actuators A are driven by one or several driving power units, designated on FIG. 1 by reference M, paired with the electric actuators A via one or several flexible transmission shafts.

These driving power units comprise at least one electrical turning machine M.

The electrical turning machines M are, further, associated with state detectors (SD) and speed sensors (SS), thus with the purpose of identifying any loss of control of the electrical turning machines M.

Moreover, according to the present disclosure, the segregation of the defense lines achieved by the bolts is completed by electrical emergency braking means, in the case of overspeed of the electrical turning machines M, due to defects in the device and/or in the case of loss of control of end of travel of the motors M.

These electrical emergency braking means allow preventing any damage to the device and any dynamic impact of the actuators on corresponding stops.

These electrical emergency braking means replacing the mechanical braking means of the prior art will be described further on with reference to FIG. 1.

Furthermore, the control system, further, comprises at least one electronic control case of ETRAC type (Electrical Thrust Reverser Actuation Controller) for piloting the electromechanical maneuvering members.

ETRAC is a unit of ETRAS (Electrical Thrust Reverser Actuation System) which is electrically linked to a motor control unit of FADEC type (Full Authority Digital Engine Control) intended to monitor and supervise the corresponding turbojet engine.

In one form, the actuators A are directly piloted by the FADEC.

This electronic control case is a computer dedicated to the nacelle or part of the latter (moveable element or specific maneuvering member, for example) intended in particular to translate the orders of opening and closing of the thrust reverser delivered by the FADEC in sequences for controlling the moveable elements and the corresponding electromechanical maneuvering members A and, on the other hand, for informing the FADEC of the state of the maneuvering members and of the position of the moveable elements.

Thus, the control laws of the electrical turning machines M are delivered by the electronic control unit, designated by reference 10 on the FIG. 1, comprised in the ETRAS.

As regards the electrical turning machine M, it is a reversible alternator which operates in alternator mode that is to say, as an electric generator and in starter mode that is to say, as an electric motor to drive the corresponding electromechanical maneuvering members via the transmission shafts.

This motor M may be any type of known electric motor and will no longer be described in detail hereinafter.

It is to be noted that, considering the deployment or closing times of the moveable elements during the thrust reversal, the motor M switches from motor mode to the generator mode in direct jet and in reverse jet of the thrust reversal device, namely when the moveable elements switch from a closing position to an opening position and vice versa.

In one form, the change in mode of the electrical motor M is detected by the electronic control unit 10 of the ETRAS by the sign reversal of the current at the terminals of the electrical motor M.

It is worth noting that this change occurs for two stage current values determined different in direct jet and reverse jet of the thrust reversal device.

These current values depend, in particular, on the type of thrust reversal achieved.

With reference to FIG. 1, more particularly, the electronic control case ETRAC further comprises, a power control unit 20 able to control the electric motors M, by means of a computer and an associated piloting software.

This unit 20 is mainly intended to manage the electric supply of the electrical actuators of the moveable elements of the thrust reverser 2 and the electrical motors M.

It thus comprises, at least one voltage control output 1, 2, 3 supplying the electrical motor M or electrical motors, according to control inputs 12 of the electronic control unit 10 transmitting deployment and closing orders of the moveable elements.

More particularly, this power control unit 20 is suited to pilot control sequences:
 of an electronic power circuit 100 of the motor M;
 of an energy dissipation circuit 100, in generator mode of the motor M and/or
 possibly, of a braking energy recovery circuit, in generator mode of the motor M.
 In addition, according to the present disclosure, with reference to FIG. 1, the electronic control unit 10 is suited to pilot the control of an electrical emergency braking electronic circuit 200 which acts as a brake for the motor M, by replacing the electrical control mechanical braking means or other of the prior art.

By electrical emergency braking electronic circuit, it meant an entirely electronic brake, without mechanical means acting either on an element of the motor M or on a driving shaft of the latter.

Such a circuit will be described in further detail further down with reference to FIG. 1.

With reference to FIG. 1, the power control unit 20 is able to manage the electrical supply of the related electrical devices, connected to the electrical network of the aircraft.

Within this context, the power circuit 100 of the motor M exhibits at least one electric supply input S of the related electrical devices, connected to the electric network of the aircraft.

In the case where the electric network of the aircraft has alternating current, the power control unit 20 provides the rectifying and the filtering of the alternative input voltage by suitable means (not illustrated) for providing a continuous electric voltage to the power circuit 100. The power circuit 100 converts the continuous voltage into an alternative voltage suited to the motor M.

It thus, transforms and adapts, the electrical signal from the airplane network to provide the regulated voltage signals in order to supply the electric motor M or electric motors of the actuators A.

More particularly, as is visible on FIG. 1 in one form, the power circuit 100 of the motor M is a circuit in which is provided a three-phase voltage signal 1, 2, 3 of variable frequency to the motor M.

The variation in voltage frequency applied to the motor M drives the speed variation of the latter.

This power circuit 100 comprises one or several power converters of undulator type 120 outputting the three-phase signal 1,2,3 voltage.

This undulator 120 regulates the currents of phase 1, 2, 3 by imposing the frequency of the rotating field and the amplitude of the current in the related motor M or motors.

This undulator 120 is, typically, formed of six pairs of transistors IGBTs T (T3 to T8) and free-wheel diodes D (D3 to D8).

Furthermore, the control unit 10 comprises data inputs (illustrated in a non-limiting manner by reference 11) receiving data from a position sensor of the motor M and/or the associated actuator A, from a speed sensor (SS) of the motor M and/or the associated actuator A, from a state detector (SD) of an actuator A and one or several data outputs sending data representing the status of the thrust reversal system.

In addition to the data coming from the position sensors, the control unit 10 may also, receive data coming from a braking detector of the motor M.

Obviously, the received and sent data is not limited to the types of data introduced by way of example but may be any type of data essential to the electronics used in power management and logic process.

Furthermore, as aforementioned, the power control unit 20 comprises an energy dissipation circuit 105 generated in the motor M, in generator mode of the latter, during the electrodynamic braking of the actuators A.

Within this context, the power control unit 20 provides, the control of a discharge element 110 (R1) of the electric motor M or electric motors of another energy dissipation device.

The braking is carried out by energy dissipation generated in the motor M through a dissipation resistor R1 by piloting a brake chopper on the voltage source, of control transistor type T1.

This allows, in particular, not to disrupt the quality of the electric network of the airplane by reinjecting the braking energy therein.

Each motor M, during the displacement of the moveable elements to their closing position and/or their deployed position in direct jet and in reverse jet, is piloted by speed and/or torque set points transmitted by the power control unit 20.

The power control unit 20 provides the voltage signals 1,2,3 to the electric motor M in conformity with a profile of motor M speed predetermined by the control unit 10 of the ETRAS.

The consideration of this speed profile by the motor M determines the application of an electric emergency braking of the motor M.

Within this context, the electric supply circuit of the power control unit 20 comprises an electric 200 emergency braking electric system of which a first form is illustrated on FIG. 1.

This emergency braking system 200 first, comprises, a loop for controlling the state of operating of the electric motor M supplied by the power control unit 20.

In order to monitor the power of the motor M, the control unit 10 receives, in input 11, from the dedicated sensor an information pertaining to the rotational speed of the electric motor M.

The control unit 10 comprises means 240 suited for processing these input data and checking that the measured rotational speed of the motor M, estimated or determined is maintained lower than or equal to an allowed top speed Vmax.

These means 240 are associated with the electric circuit 200 of electric braking allowing it, all by itself, to act, selectively and instantaneously, on the electric motor M to brake the rotation by applying an electric braking torque, when the rotational speed of the motor M exceeds the allowed top speed Vmax.

This electric braking electronic circuit 200 is suited for suspending any control of the motor M by the orders of the control unit 10 of the ETRAS and braking the overspeed of the motor M by regulating it at a predetermined and allowed minimum speed Vmin.

The allowed top speed Vmax may be different or not according to the position of the actuator driven by the motor M on its nominal travel.

Thus, the value of the allowed top speed Vmax may vary according to the position of the actuator driven by the motor M in its displacement to its closing position and/or to its deployed position in direct jet and in reverse jet, when the overspeed of the motor M is identified.

The electric braking electronic circuit 200 comprises at least one electric energy dissipation device 220 mounted, in series, between a switch 230 and a rectifier bridge 210 of which the voltage supply input is formed of each of the phases 210 of the three-phase voltage signal 1, 2,3 of the motor M.

This rectifier is suited to rectify the voltage signal of the motor M and dissipate the power of the latter in the electric energy dissipation device 220.

In a non-limiting form, the rectifier is a natural commutation circuitry marked PDi, i being the number of rectified phases.

In one form example, i is equal to 3 and this rectifier bridge 210 PD3 is a diode bridge.

As for the electric switch 230 which is able to be piloted, it is able to be controlled by a control line 202 coming from the control unit 10 of the ETRAS via the control means 240 according to the speed of the motor M.

The control unit 10 is suited to suspend the supply on the power circuit 100 when the speed of the motor M is higher than the considered speed Vmax.

The switch 230 may be a thyristor which will remain conductive until the turning off of the circuit in the case of a defect of overspeed of the motor M.

Thus, when the speed of the motor M is determined as an overspeed by the control means 240, a closing control signal is transmitted to the switch 230 which shuts off and the rectifier 210 recovers, by the three lines 201, the three voltage phases 1, 2, 3 of the motor M which constitutes the voltage source 201 of the electric braking circuit.

The braking energy is, as such, directed to the electric energy dissipation device 220 of the electric emergency braking electric circuit 200.

This device is a dissipation resistor R2.

The electric braking circuit 200 is suited for dissipating the power of the motor M in such a manner as to regulate the speed of the motor M in order to guide it to the braking speed Vmin and direct the actuator at the end of travel without mechanical bump on the corresponding end of travel stop and without mechanical degradation of the actuator A.

The end of travel stop of the actuator is fashioned to stop the motor M after it has reached the braking speed Vmin.

In another form, the energy dissipation circuit 105 may be replaced by a circuit for recovering the braking energy of the electric motor M when it is in generator mode during the displacement of the moveable elements to their closing position and/or to their deployed position in direct jet and in reverse jet. This circuit comprises, in particular, one or several energy storage devices of capacitance or ultracapacitance type.

A method for implementing the control system according to the present disclosure is the following.

It has been selected, in a non-limiting manner, to illustrate the method in the context of the motor M in generator mode.

At the end of travel of a moveable element of the thrust reversal device, during its displacement in direct jet or in reverse jet, when the motor M switches to generator mode, one acts with well determined strategies by means of the control and electric supply circuit of the power control unit 20, to control with precision the displacement of the motor M and hence the corresponding displaced element.

The power control unit 20 pilots the undulator 120 to make it operate the electric motor M in generator mode and gives it a speed set point.

The state detectors and the suitable sensors allow analyzing the displacement of the moveable element of the thrust reversal device and the rotational speed of the associated electric motor M.

As long as the rotational speed of the electric motor M is not higher than the top speed Vmax linked to the position of the actuator A associated with the motor M, then the power control unit 20 controls the energy dissipation circuit 105 of the motor M in the discharge resistor R1.

In another form, it may control the circuit for storing the braking energy of the motor M in an energy storage device.

If the rotational speed of the electric motor M is higher than the predetermined top speed Vmax, then the control unit 10 controls the electric emergency braking circuit to regulate the speed of the motor M.

In fact, when the speed of the motor exceeds the maximum threshold speed Vmax, the operating of the motor is considered as defective.

The control unit 10 controls the change in position of the switch 230 which moves in such a manner as to place the dissipation element R2 220 in circuit.

The power of the motor M in overspeed is dissipated in the element R2 and an electric braking torque R2 is produced suited for reaching a speed of the motor M corresponding to the minimum predetermined speed Vmin, in such a manner as to bring the actuator A associated with the motor M at the end of travel without a dynamic bump on its travel stop.

The operating of the electric braking circuit 200 allows overcoming the loss of control of the motor M.

The power control unit 20 stops any control order by the control unit 10 of the ETRAS of the defective motor M and instantaneously reduces the speed of the motor M to the value Vmin by braking the motor M.

Hence, it is understood that the system is very safe, without it slowing down the thrust reverser.

Furthermore, no mechanical interaction of a brake with the mechanical elements of the motor at full speed being performed, any wear of the motor is prevented by this electric emergency braking.

Moreover, such a control system allows attenuating the mechanical vibrations during triggering in overspeed and prevents mechanical defects.

The one skilled in the art will further, appreciate, with respect to the systems for controlling the electric devices of the nacelle of the prior art, a control system allowing to reduce the damage to the actuators.

The precepts of the present disclosure are obviously applicable to the actuation of a cowl of thrust reverser but more generally to the actuation of all types of moveable elements on an aircraft nacelle.

What is claimed is:

1. A control system for a thrust reverser with moveable elements, the control system comprising:
    at least one electromechanical actuating member of said moveable elements;
    an electric driving unit of said electromechanical actuating member;
    a control unit; and
    a power control unit to control the electric driving unit for moving the moveable elements to a closing position and/or to a deployed position,
    wherein the control system further comprises an electric braking electronic circuit that automatically and electronically brakes the electric driving unit when the electric driving unit experiences overspeed during a displacement of the moveable elements to the closing position and/or to the deployed position.

2. The control system according to claim 1, wherein the control unit is configured to pilot the electric braking electronic circuit when a speed of the electric driving unit is higher than a threshold speed, in generator or electric driving unit motor mode.

3. The control system according to claim 2, wherein a value of the threshold speed is a function of a position of the electromechanical actuating member driven by the electric driving unit in its displacement to its closing position and/or to its deployed position.

4. The control system according to claim 1, wherein the electric braking electronic circuit is configured to suspend any control of the electric driving unit and to regulate a speed of the electric driving unit as to attain a predetermined minimum speed set point.

5. The control system according to claim 1, further comprising one or several ends of travel stops for the electromechanical actuating member fashioned for stopping the electromechanical actuating member after the electric driving unit has attained a minimum speed set point.

6. The control system according to claim 4, wherein the electric braking electronic circuit is controlled as long as the minimum speed set point has not been attained by the electric driving unit.

7. The control system according to claim 1, wherein the electric braking electronic circuit comprises at least one electric energy dissipation device mounted, in series, with a two-state switch, one of two states being suited for connecting the electric driving unit to the energy dissipation device and a rectifier of which an input voltage is formed from an output signal of a power circuit of the electric driving unit.

8. The control system according to claim 7, wherein the electric energy dissipation device is a power resistor.

9. The control system according to claim 7, wherein the rectifier is a diode bridge circuitry with natural commutation.

10. The control system according to claim 7, wherein the power circuit comprises one or several power converters of undulator type configured to output three-phase signal voltage.

11. The control system according to claim 1, wherein the electric driving unit is associated with state detectors and speed sensors, which identify any loss of control of the electric driving unit.

12. The control system according to claim 1, wherein the electric driving unit is a reversible alternator which operates in an alternator mode, and is an electric motor which operates in a starter mode.

13. A nacelle comprising at least one moveable element and a control system according to claim 1.

* * * * *